US008644181B2

(12) United States Patent  
Zhao et al.

(10) Patent No.: US 8,644,181 B2
(45) Date of Patent: Feb. 4, 2014

(54) METHOD AND APPARATUS FOR ESTIMATION OF CHANNEL TEMPORAL CORRELATION AND MIMO MODE SELECTION IN LTE SYSTEM

(75) Inventors: Xue-yuan Zhao, Hong Kong (HK); Wing Chau Chan, Hong Kong (HK); Cheng Wang, Hong Kong (HK); Henry Hui Ye, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 257 days.

(21) Appl. No.: 13/210,395

(22) Filed: Aug. 16, 2011

(65) Prior Publication Data

US 2013/0044610 A1    Feb. 21, 2013

(51) Int. Cl.
*H04W 4/00* (2009.01)
*H04W 24/00* (2009.01)

(52) U.S. Cl.
USPC ............................. 370/252; 370/329; 370/341

(58) Field of Classification Search
None
See application file for complete search history.

(56) References Cited

U.S. PATENT DOCUMENTS

| 6,563,861 | B1 | 5/2003 | Krasny et al. |
| 6,680,969 | B1 | 1/2004 | Molnar et al. |
| 6,922,452 | B2 | 7/2005 | Sandberg |
| 8,112,095 | B2 * | 2/2012 | Haimovich et al. ........... 455/453 |
| 2007/0121739 | A1 | 5/2007 | Kind |
| 2008/0056390 | A1 | 3/2008 | Rainbolt et al. |
| 2008/0139153 | A1 * | 6/2008 | Tuo et al. ................... 455/277.2 |
| 2009/0003475 | A1 | 1/2009 | Erceg et al. |
| 2010/0063791 | A1 * | 3/2010 | Wen et al. ....................... 703/13 |
| 2010/0246505 | A1 * | 9/2010 | Chong et al. .................. 370/329 |
| 2011/0085504 | A1 * | 4/2011 | Chong et al. .................. 370/329 |
| 2012/0307929 | A1 * | 12/2012 | Seo et al. ...................... 375/267 |

* cited by examiner

*Primary Examiner* — Chi Pham
*Assistant Examiner* — Soon-Dong D Hyun
(74) *Attorney, Agent, or Firm* — Ella Cheong Hong Kong; Sam T. Yip

(57) ABSTRACT

The present invention relates to a method and apparatus for channel temporal correlation estimation and MIMO mode selection. An embodiment of the invention under LTE system utilizes SRS symbols for temporal correlation estimation and performs MIMO mode selection based on the said temporal correlation estimation.

19 Claims, 10 Drawing Sheets

METHOD AND APPARATUS FOR ESTIMATION OF CHANNEL TEMPORAL CORRELATION AND MIMO MODE SELECTION IN LTE SYSTEM

TECHNICAL FIELD

The present application relates generally to telecommunications. In particular, the present application relates to wireless communication networks with systems using multiple antennas, for example, MIMO (multiple-input-multiple-output) antennas.

BACKGROUND

In a MIMO communication system, multiple antennas are used at both the transmitter and the receiver, for example, of a base station (BS). By exploiting the spatial dimensions of the multiple antenna transceiver, concurrent transmissions of signals by multiple antennas can be realized, thus increasing the spectral efficiency and achieving higher data rates without increasing transmission bandwidth.

In general, MIMO communication systems can be broadly classified into two types: open loop systems and closed loop systems. For open loop systems, there is no feedback of channel information from the user equipment to the base station. In contrast, for closed loop systems, feedback of channel information is provided by the user equipment to the base station, and the base station adopts the transmission mode according to the feedback information.

There is a need to provide the feedback but there is also a tradeoff for doing so. For example, one advantage of having the feedback is to allow the system to adapt to the varying channel conditions in a timely manner, thus effectively improving the system performance, for example, increasing the physical layer throughput. Nevertheless, it is very challenging to feed the channel information back to base station efficiently given the amount of the channel coefficients, the small bandwidth of a feedback control channel, and the fact that the feedback control channel is shared by different users in the same system. This means when the full channel information is continuously provided to the base station, a heavy loading will be exerted upon the system, consuming system resources that could otherwise be allocated to other functions.

Attempts have been made to minimize the channel information in the feedback to reduce the heavy loading so that closed loop systems are further classified into two types: limited feedback systems and rich feedback systems. For limited feedback systems, only partial or limited channel information is sent. However, for rich feedback systems, full channel information such as full CSI (channel state information) is sent.

Another attempt to handle the tradeoff for providing feedback is, instead of providing feedback continuously, the system is switched between two modes of operation wherever appropriate: open loop mode and closed loop mode.

The U.S. Patent Application Pre-grant Publication No. US2009/0003475A1 discloses the adaption between different closed loop, open loop and hybrid techniques. The adaption is based on a selected one of: a baseline quantity of channel information in feedback (similar to rich feedback system), a reduced quantity version of the baseline quantity of channel information in feedback (similar to limited feedback system), or no channel information in feedback (similar to open loop system).

However, the existing approaches have a number of limitations and disadvantages, some of which will be illustrated below and become apparent to a person skilled in the art through comparing existing systems with some aspects of the present invention.

SUMMARY OF THE INVENTION

In the LTE system according to one embodiment of the present invention, only limited feedback information is transmitted. In particular, the uplink feedback information for the downlink adaption includes precoding matrix indicator (PMI) and rank indicator (RI).

One aspect of the present invention is to address the problem: Under which conditions, an LTE downlink transmitter should adapt itself to closed loop mode, and under which condition it should not. This leads to the study of characterizing of channel temporal correlation which estimation is based on an uplink transmitted resource for example, Sounding Reference Signal (SRS) in particular, and the determination of a threshold/criterion on the channel temporal correlation for the LTE downlink transmitter to switch between open loop and closed loop modes.

The present invention controls downlink mode switching based on the Doppler estimation, or equivalently the channel temporal correlation computation, of the uplink. Given the rich-scattering channel condition, the Doppler estimation and the channel temporal correlation is numerically related. To perform an effective downlink mode switching, it is desirable if the Doppler/channel temporal correlation is estimated with certain degree of accuracy. The granularity, or the degree of accuracy, of the channel temporal correlation (or Doppler frequency) estimation is important, because we need to ensure the estimated value is effective for algorithms operating at that region of magnitude. For example, a MIMO mode switching algorithm based on comparing Doppler frequency estimate with some threshold values will require Doppler frequency estimation to be accurate to the degree of the threshold value of the Doppler frequency.

In the indoor environment for an LTE system, a typical Doppler frequency threshold for MIMO mode selection is around 5 Hz. If the Doppler frequency or channel temporal correlation is estimated using reference symbols which are 1 ms apart, 5 Hz Doppler corresponds to a channel temporal correlation coefficient of 0.9998 (obtained from $J_0(2p \times 5 \times 10^{-3})$=0.9998 assuming Clarke/Jakes channel model, where $J_0(x)$ is the zero order Bessel function of the first kind. It is very close to one, which corresponds to zero Doppler frequency. Hence, the difference in channel temporal correlation is tiny in such a low Doppler frequency regime, and an estimator of high granularity for the channel temporal correlation is required in order to obtain a reasonably accurate estimate for the Doppler frequency. However, such a time correlation estimation task is hard to be achieved in practice, where various distortions and noise can easily disturb the estimation result. Hence, 1 ms separated references should be an inappropriate resource for the estimation task.

In summary, with the high granularity estimation requirement in mind, there are two main points addressed by the present invention, such that the temporal correlation estimation and MIMO mode selection could be feasible for implementation in a real system, First, a method to determine the threshold value for switching between the closed loop mode and the open loop mode is given. In one embodiment of the present invention, a threshold determination method based on PMI change probability is described.

Second, the resources for estimating the Doppler frequency up to certain granularity, i.e. up to certain degree of accuracy, is described. For a low Doppler frequency regime, a Doppler estimator of high granularity is required because the threshold value for mode switching is around a few Hz. In one embodiment of the present invention, a Sounding Reference Signal (SRS) based Doppler computation method is proposed for the Long Term Evolution (LTE) system.

The present invention provides a practical solution capable of estimating low Doppler frequency at high granularity and using such information for the purpose of MIMO mode selection between closed loop mode and open loop mode.

One aspect of the present invention is to estimate Doppler frequency at high granularity. This enables, for example, the implementation of the MIMO communication system in an indoor environment using LTE. Conventionally speaking, the Demodulation Reference Symbol (DMRS) is used for Doppler estimation. However, due to some of its structural properties, the DMRS is spaced by less than 1 ms, thus insufficient to estimate low Doppler at high granularity.

The present invention proposes to use the Sounding Reference Signal (SRS) for Doppler estimation in one embodiment. Conventionally speaking, the SRS is designed for estimating the uplink channel quality indicator (CQI). However, in the present invention, SRS is used for estimating low Doppler frequency at high granularity to take advantage of its favorable structural properties. The favorable structural properties include, for example, periodic time-domain allocation of 5 ms or 10 ms spacing, and constant frequency-domain allocation.

The present invention relates to an apparatus for changing between an open loop mode and a closed loop mode in a MIMO communication system. The apparatus includes one or more processors configured to select a plurality of feedback delays $d_1$ to $d_m$ where m is the number of feedback delays to be used to obtain a PMI change probability; determine a plurality of PMI change probabilities $P_1$ to $P_m$ for each of a plurality of Doppler frequencies $f_1$ to $f_n$ where n is the number of Doppler frequencies to be used to obtain a PMI change probability; determine a Doppler frequency as a Doppler frequency threshold value based on a desired PMI change probability; and control a change between the open loop mode and the closed loop mode based on the threshold value of Doppler frequency.

Furthermore, each of the Doppler frequencies $f_1$ to $f_n$ can be selected to be around 5 Hz. The number m can be an integer equal to or greater than 100. Each of the PMI change probabilities $P_1$ to $P_m$ can be determined from a PMI parameter and another PMI parameter after a feedback delay.

The processor is further configured for receiving one or more sounding reference signals from a user equipment and for using the sounding reference signals to perform channel estimation such that an SRS-based channel estimate is obtained. The processor may also be configured to determine a time correlation value from two consecutive SRS-based channel estimates, optionally by mapping the threshold value of Doppler frequency to a threshold value of channel temporal correlation. The mapping is implemented according to a U-shaped Doppler spectrum, assuming rich-scattering channel environment. The change between the open loop mode and the closed loop mode is controlled by comparing the estimated channel temporal correlation value with the threshold value of channel temporal correlation as derived from the Doppler frequency threshold value.

The present invention also relates to a method for switching between open loop mode and closed loop mode in a MIMO communication system. The method includes selecting a plurality of feedback delays $d_1$ to $d_m$ where m is the number of feedback delays to be used to obtain a PMI change probability; computing a plurality of PMI change probabilities $P_1$ to $P_m$ for each of a plurality of Doppler frequencies $f_1$ to $f_n$ where n is the number of Doppler frequencies to be used to obtain a PMI change probability; determining a Doppler frequency as a threshold value of Doppler frequency based on a desired PMI change probability; and controlling a switch between the open loop mode and the closed loop mode based on the threshold value of Doppler frequency.

Furthermore, each of the Doppler frequencies $f_1$ to $f_n$ can be selected to be around 5 Hz. Each of the PMI change probability can be determined from a PMI parameter and another PMI parameter after a feedback delay.

The method further includes receiving one or more sounding reference signals from a user equipment. The method further includes using the sounding reference signals to perform channel estimation such that a SRS-based channel estimate is obtained. The method further includes computing a time correlation value from two consecutive SRS-based channel estimates. The method further includes determining a threshold value of channel temporal correlation by mapping the threshold value of Doppler frequency to a channel temporal correlation value. The mapping is implemented according to a U-shaped Doppler spectrum. The change between the open loop mode and the closed loop mode is controlled by comparing the time correlation value with the time correlation threshold value as derived from the Doppler frequency threshold value. Another aspect of the present invention is to use a method based on Precoding Matrix Indicator (PMI) feedback in an uplink (UL) to determine the threshold value in terms of Doppler frequency for switching between open loop mode and closed loop modes. Based on the simulation results of PMI change rate, a meaningful threshold value for closed loop and open loop switching can be determined for an LTE system.

Other aspects of the present invention are also disclosed as illustrated by the following embodiments.

BRIEF DESCRIPTION OF THE DRAWINGS

These and other objects, aspects and embodiments of this claimed invention will be described hereinafter in more details with reference to the following drawings, in which:

DETAILED DESCRIPTION OF THE INVENTION

To further enhance understanding of the present invention, Doppler estimation is briefly discussed below.

Doppler estimation is to estimate a Doppler frequency. For mobile radios, where multi-path propagation is common, the phase relationship between the components of various mobile radios changes, so the resultant signal at the receiver is spectrally spread. This spectral spread is known as Doppler spread. When relative motion exists in the absence of multi-path propagation, there is only one received signal and there is a shift of the received signal in frequency, but no spreading of the received signal spectrum. This phenomenon is known as Doppler shift.

The present invention applies for any manner of time variation of the channel, including but not limited to Doppler spread and Doppler shift. For the present embodiment, the case of Doppler spread is studied, rather than Doppler shift. Doppler frequency is defined as the highest Doppler offset for Doppler spread, or the upper edge of the Doppler spectrum. Assume the estimated Doppler frequency is $f_D$, the Doppler spread $f_{Spread}$ is given by the following equation:

$$f_{spread}=2f_D \qquad (1)$$

Figure 1A:
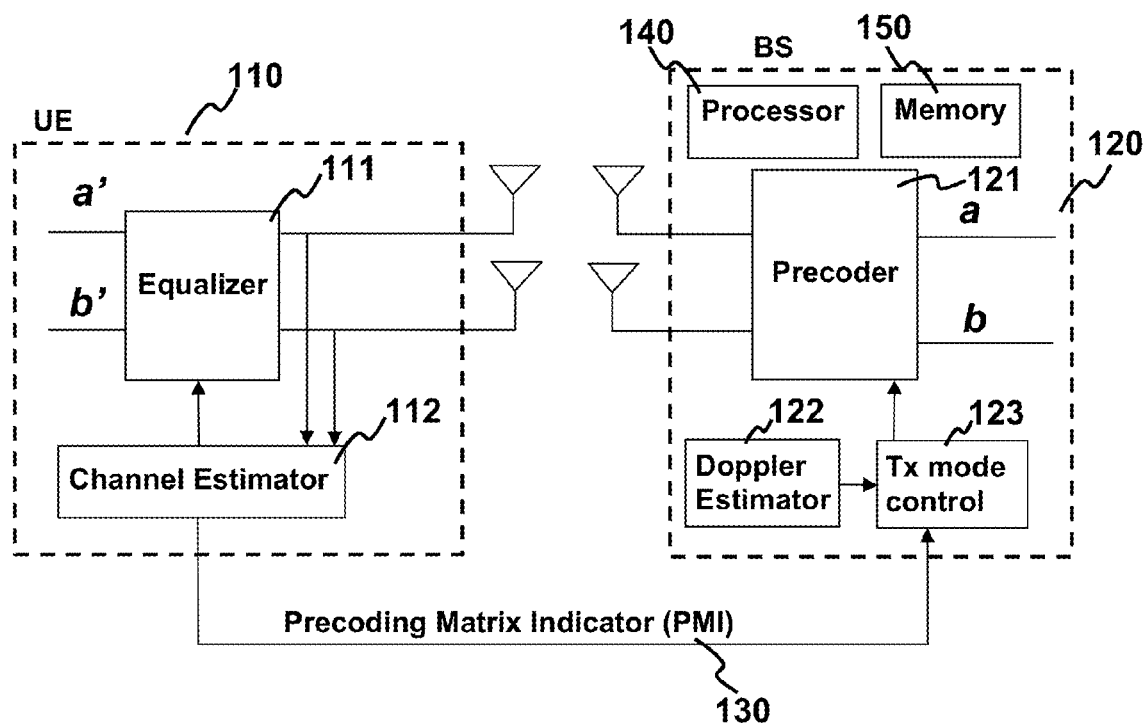
FIG. 1A schematically represents an exemplary embodiment of mode changing system.

FIG. 1A schematically represents an exemplary embodiment of a mode switching system. In one embodiment, a receiver, for example, a user terminal which is also known as user equipment (UE) 110, receives a downlink signal transmitted from a transmitter. An example of the transmitter is a base station (BS) 120 (also known as e-nodeB in LTE systems).

At the UE 110, the downlink signal as received is equalized by an equalizer 111 of the UE 110. The downlink signal contains a pilot (training) signal. The pilot signal is used by the UE 110 to estimate the channel characteristics using a channel estimator 112. Based on the channel estimation results of the channel estimator 112, the UE 110 determines the Precoding Matrix Indicator (PMI) and feedbacks the PMI to the BS 120 through a dedicated uplink feedback channel, for example, the Physical Uplink Control Channel (PUCCH) specified in the LTE system. The PMI is determined based on various criteria. One such criterion can be the maximum of channel capacity with the precoding matrix.

At the BS 120, an uplink signal is received. The uplink signal contains a pilot signal, which is also known as a reference signal or an uplink reference signal. The pilot signal is used by a Doppler frequency estimator 122 of the BS 120 to estimate Doppler frequency. The SRS is adopted for use as pilot signals and is used by the Doppler frequency estimator 122 to estimate Doppler frequency. A transmission mode controller 123 of the BS 120 determines the transmission mode of a precoder 121, for example, either open loop transmission mode or closed loop transmission mode. The transmission mode is determined based on two parameters, the PMI feedback 130 and the estimated Doppler frequency.

Figure 1B:
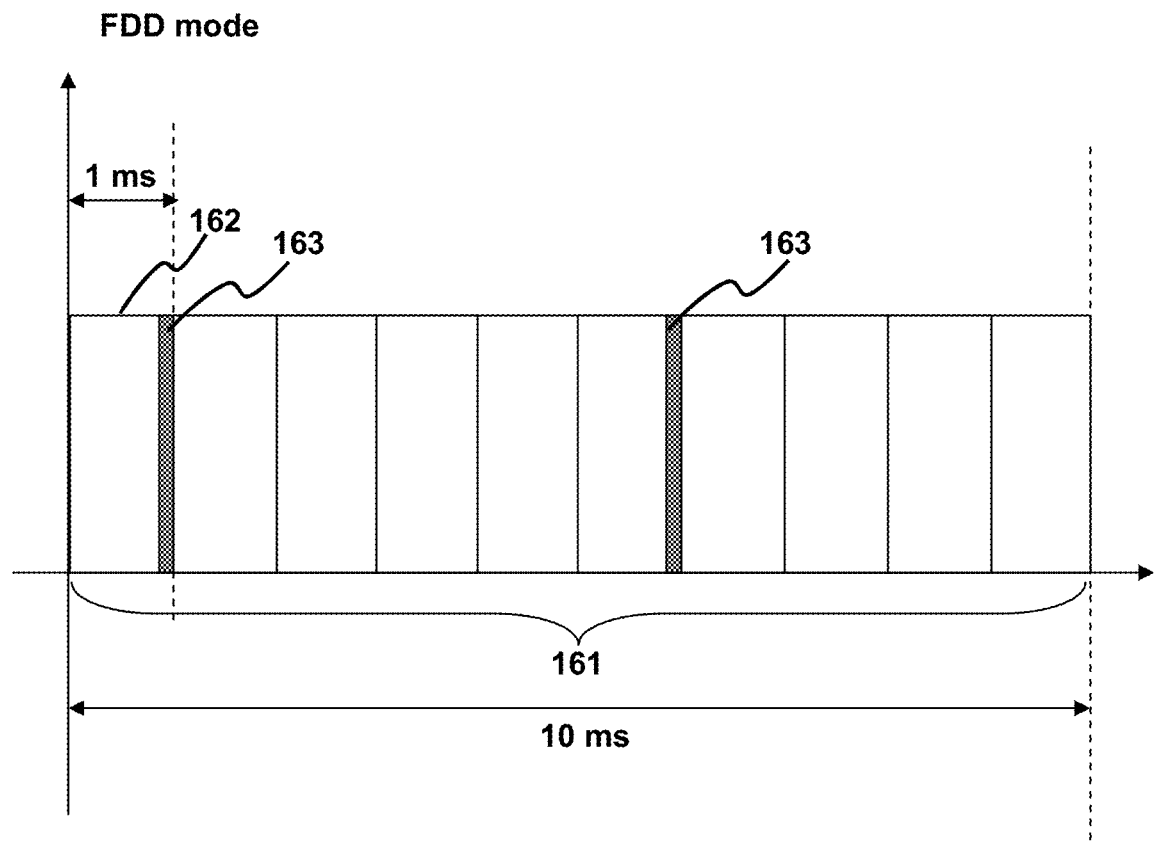
FIG. 1B shows an embodiment of SRS configuration in FDD mode of an LTE system.

FIG. 1B shows an embodiment of SRS configuration in FDD mode of an LTE system. In this exemplary embodiment, each radio frame 161 is 10 ms long and is made up of subframes 162 where each subframe 162 has a length of 1 ms. A SRS 163 is provided every 5 ms as the last symbol of one of the subframes 162.

Figure 1C:
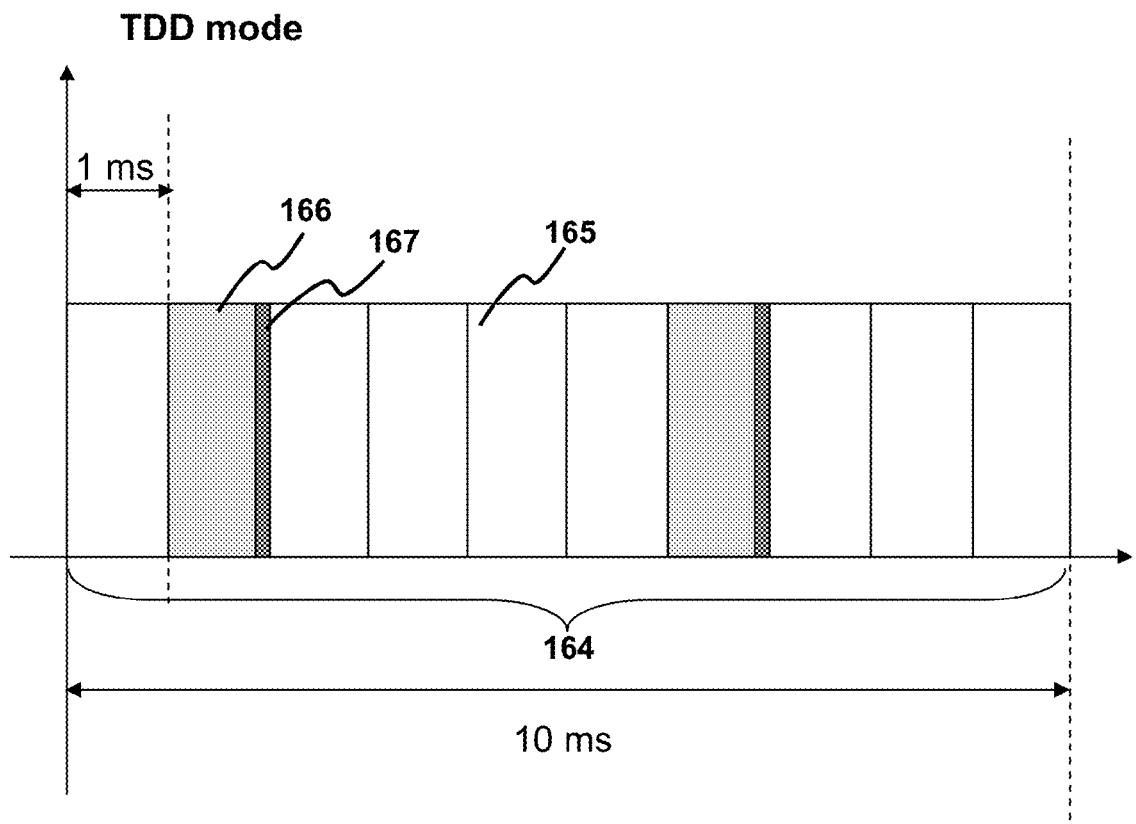
FIG. 1C shows an embodiment of SRS configuration in TDD mode of an LTE system.

FIG. 1C shows an embodiment of SRS configuration in TDD mode of an LTE system. In this exemplary embodiment, each radio frame 164 is 10 ms long and is made up of subframes 165 where each subframe 165 has a length of 1 ms. A special subframe 166 is provided every 5 ms, containing a SRS 167 as its last symbol.

Figure 2A:
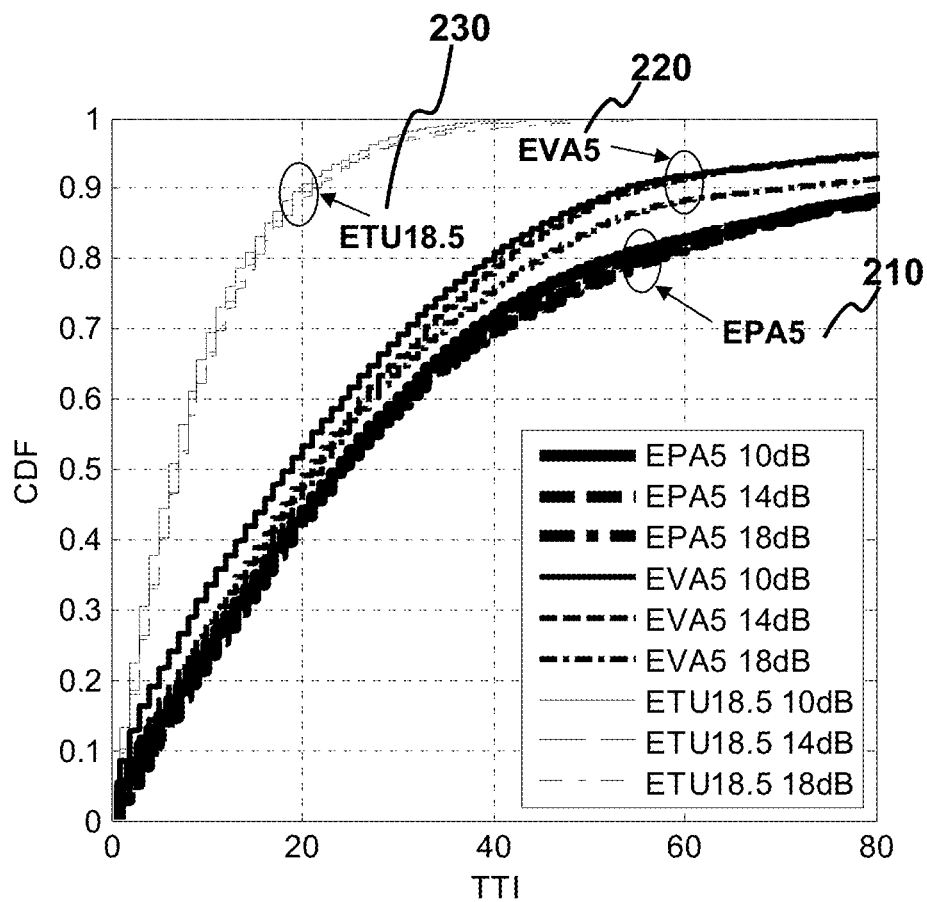
FIG. 2A shows a plot of simulation results of the PMI change probability against the feedback delay in one embodiment.

FIG. 2A shows a plot of simulation results of the PMI change probability against the feedback delay in one embodiment. There is a time delay to feedback the PMI signal from the UE to the BS. The x-axis of the plot in FIG. 2A is the time delay measured in milliseconds. The y-axis of the plot in FIG. 2A is the probability of current PMI feedback being different from the previous PMI feedback, as defined by the following equation:

$$y\_axis = Pr\{PMI(n) \neq PMI(n-1)\} \qquad (2)$$

where the index n is the current feedback index.

The PMI is computed in UE based on the estimated downlink channel response. A possible method to compute the PMI can be the maximization of channel capacity by searching all available PMI.

The simulation is performed under various channel conditions including EPA5, EVA5 and ETU 18.5. The EPA5 stands for Extended Pedestrian A channel with 5 Hz Doppler frequency, and it is used to simulate an indoor scenario for LTE. The EVA5 stands for Extended Vehicular A channel with 5 Hz Doppler frequency, and it is used to simulate an outdoor scenario. The ETU 18.5 stands for Extended Typical Urban with 18.5 Hz Doppler frequency, and it is used to simulate an outdoor channel. The signal-to-noise ratios (SNR) shown in the curves include 10 dB, 14 dB and 18 dB. In this exemplary simulation, it is assumed that the number of the transmitting antennae is equal to 2, the number for receiving antennae is equal to 2, and the number of resource blocks used is equal to 50.

The plot in FIG. 2A shows that for a feedback delay of 10 ms, the PMI change probability is around 0.2 for an EPA5 channel, around 0.3 for an EVA5 channel and around 0.65 for an ETU 18.5 channel. For closed loop MIMO operation, a stable channel condition is required, so a low PMI change probability is desired. According to the simulation, it can be observed that a low Doppler frequency is required in order to provide a low PMI change probability and a stable channel condition for closed loop MIMO operation. Therefore, when Doppler frequency is adopted as the threshold value for switching between open loop and closed loop operation, the threshold value is set to be a few Hz, for example, 5 Hz.

Figure 2B:
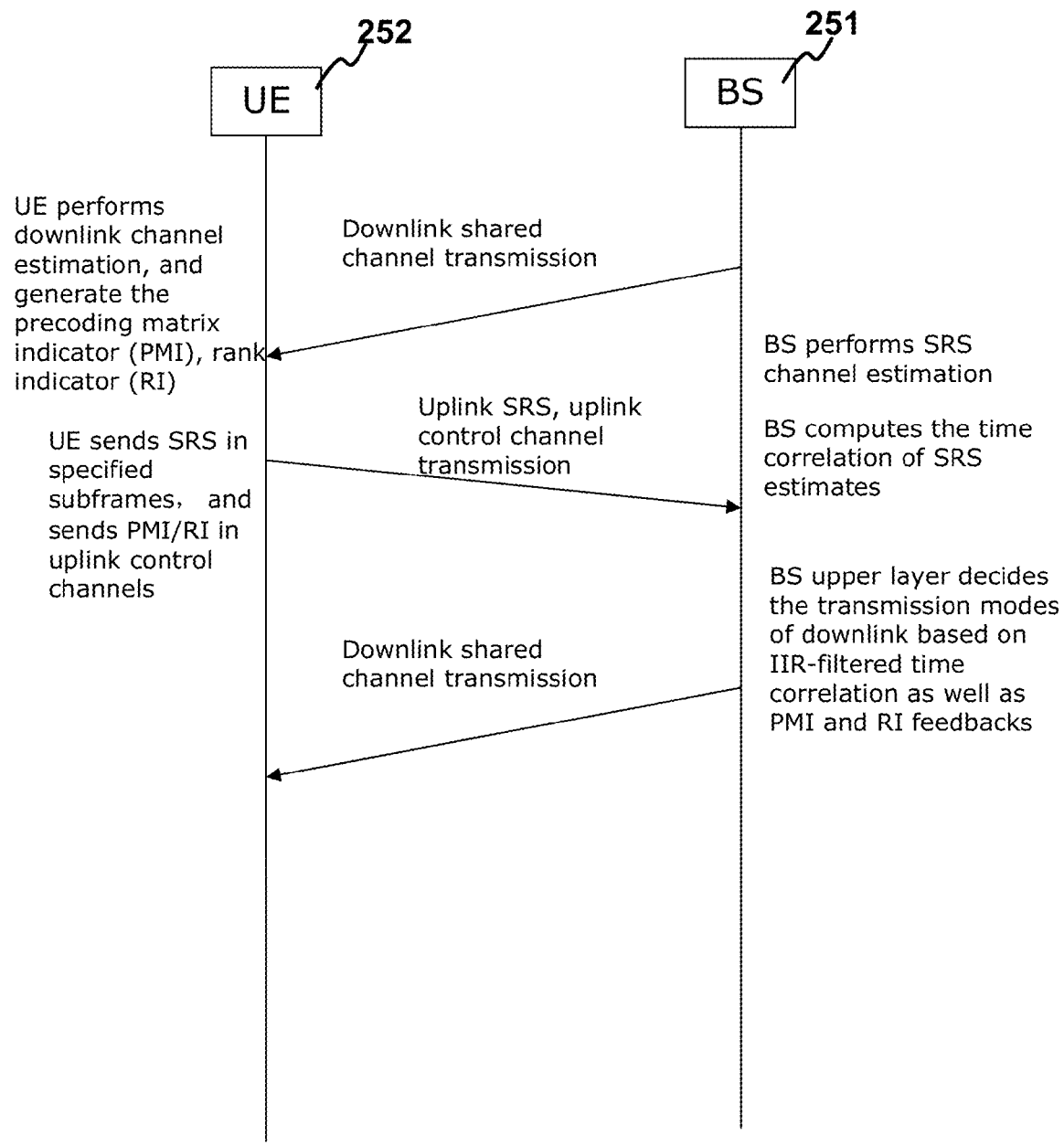
FIG. 2B shows how a base station interacts with a user equipment in an exemplary embodiment.

FIG. 2B shows how a base station interacts with a user equipment in an exemplary embodiment. The base station (BS) 251 sends information to one or more user equipments (UE) 252 during the downlink shared channel transmission. Upon receiving the information from the base station 251, the user equipment 252 performs downlink channel estimation and generates parameters such as precoding matrix indicator (PMI) and rank indicator (RI). The user equipment 252 sends SRS in one or more specified subframes as well as the PMI and RI in uplink control channels during the uplink SRS and uplink control channel transmission to the base station 251. Using the SRS received from the uplink SRS and uplink control channel transmission, the base station 251 performs SRS channel estimation and computes the time correlation of SRS estimates, which is essentially the estimate of channel temporal correlation. The upper layer of the base station 251 decides the transmission modes of downlink based on IIR-filtered channel temporal correlation estimates as well as the PMI and RI feedbacks before sending information to one or more user equipments 252 through downlink shared channel transmission.

Figure 2C:
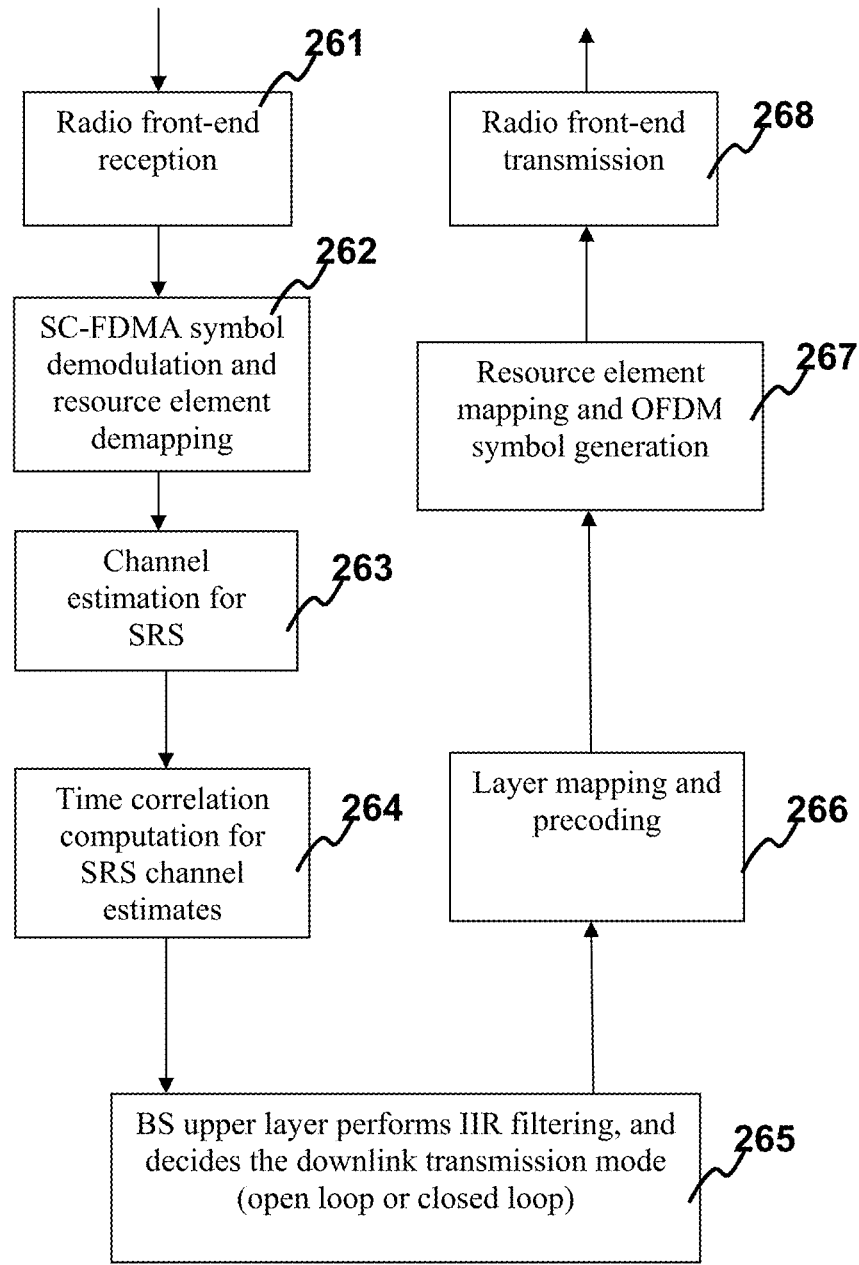
FIG. 2C shows a schematic diagram of a BS receiver and transmitter structure according to an embodiment of the present invention.

FIG. 2C shows a schematic diagram of a BS receiver and transmitter structure according to an embodiment of the present invention. At a base station, one or receiver module 261 are available to perform radio front-end reception. To retrieve information from the signal received in the radio front-end reception, a signal processing module 262 performs a number of functions such as SC-FDMA symbol demodulation and resource element demapping. An estimation module 263 performs channel estimation for SRS. Based on the results from the channel estimation, a Doppler estimator functional block 264 performs time correlation computation for SRS channel estimates. In other words, the Doppler estimator functional block 264 receives the channel estimates of uplink SRS and outputs the time-domain correlation for the transmission mode control block to manipulate the downlink transmission.

A BS upper layer module 265 of the base station performs IIR filtering and decides the downlink transmission mode, for example, whether the downlink transmission mode is an open loop mode or a closed loop mode. Before transmitting the mode selection result to one or more user equipment through radio front-end transmission by one or more transmitters 268, layer mapping and precoding are performed by a signal processing module 266 and resource element mapping and OFDM symbol generation are performed by a signal processing module 267.

Figure 3:
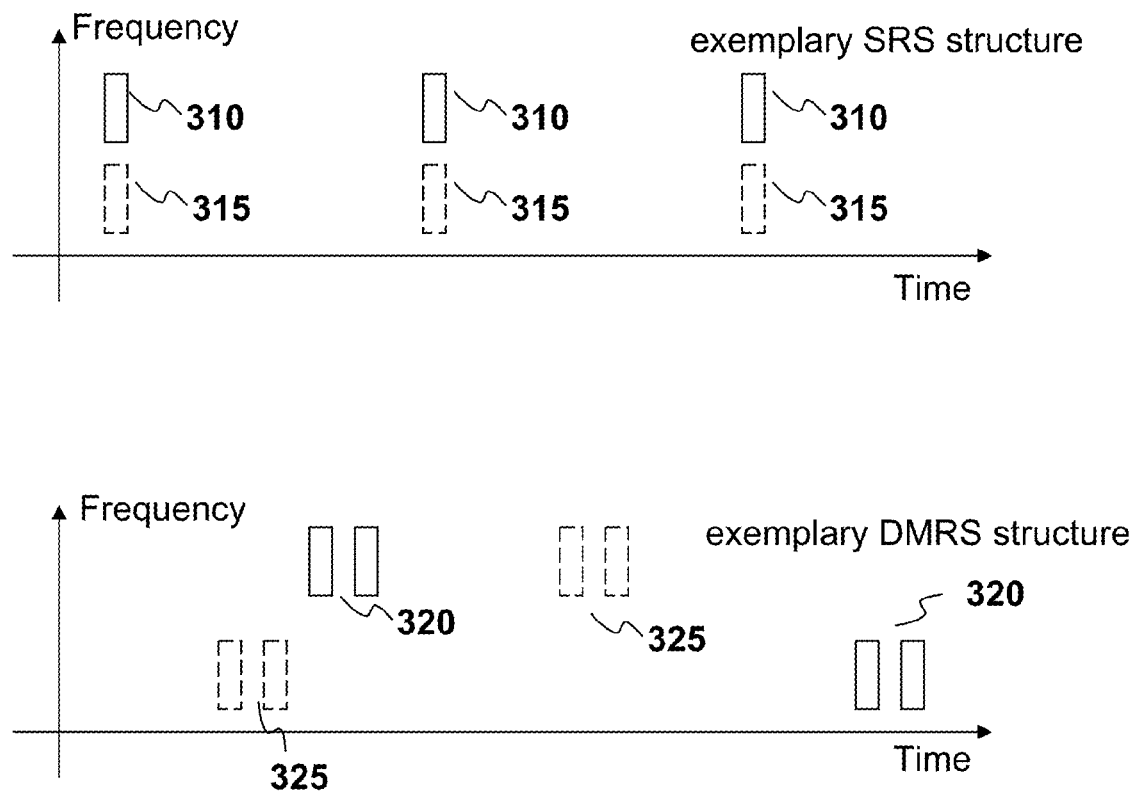
FIG. 3 depicts an exemplary embodiment of SRS structure and DMRS structure.

FIG. 3 depicts an exemplary embodiment of an SRS structure and a DMRS structure. As an example, there are two users. For SRS, there is an SRS pilot signal for each user—a first SRS pilot signal 310 for the first user and a second SRS pilot signal 315 for the second user. The SRS pilot signals are periodic in time, and have constant frequency allocation. There is a time interval between two consecutive SRS pilot signals, for example, 10 ms or 20 ms. If the time interval of 10 ms is adopted, the corresponding time-domain correlation is 0.98 if a Doppler frequency of 5 Hz is assumed. If the time interval of 20 ms and a Doppler frequency of 5 Hz are assumed, the corresponding time-domain correlation of is 0.90. To estimate low Doppler frequency, two consecutive SRS symbols are sufficient. The Doppler estimator estimates the channel temporal correlation between the two consecutive SRS symbols. This correlation is then compared with the threshold to determine the range of the Doppler. As long as the correlation value has been known, the exact Doppler value is not needed and thus not estimated.

For DMRS, there is a pilot signal for each user—a first pilot signal 320 for the first user and a second pilot signal 325 for the second user. There is a time interval between two consecutive pilot signals, for example, 0.5 ms. The corresponding channel temporal correlation is larger than 0.99 if a Doppler frequency of 5 Hz is assumed. For each user, the time location of the pilot signal is non-periodic and the frequency allocation is variable. Therefore, the DMRS is only suitable for medium and high Doppler frequency estimation and not applicable for low Doppler frequency estimation.

Figure 4:
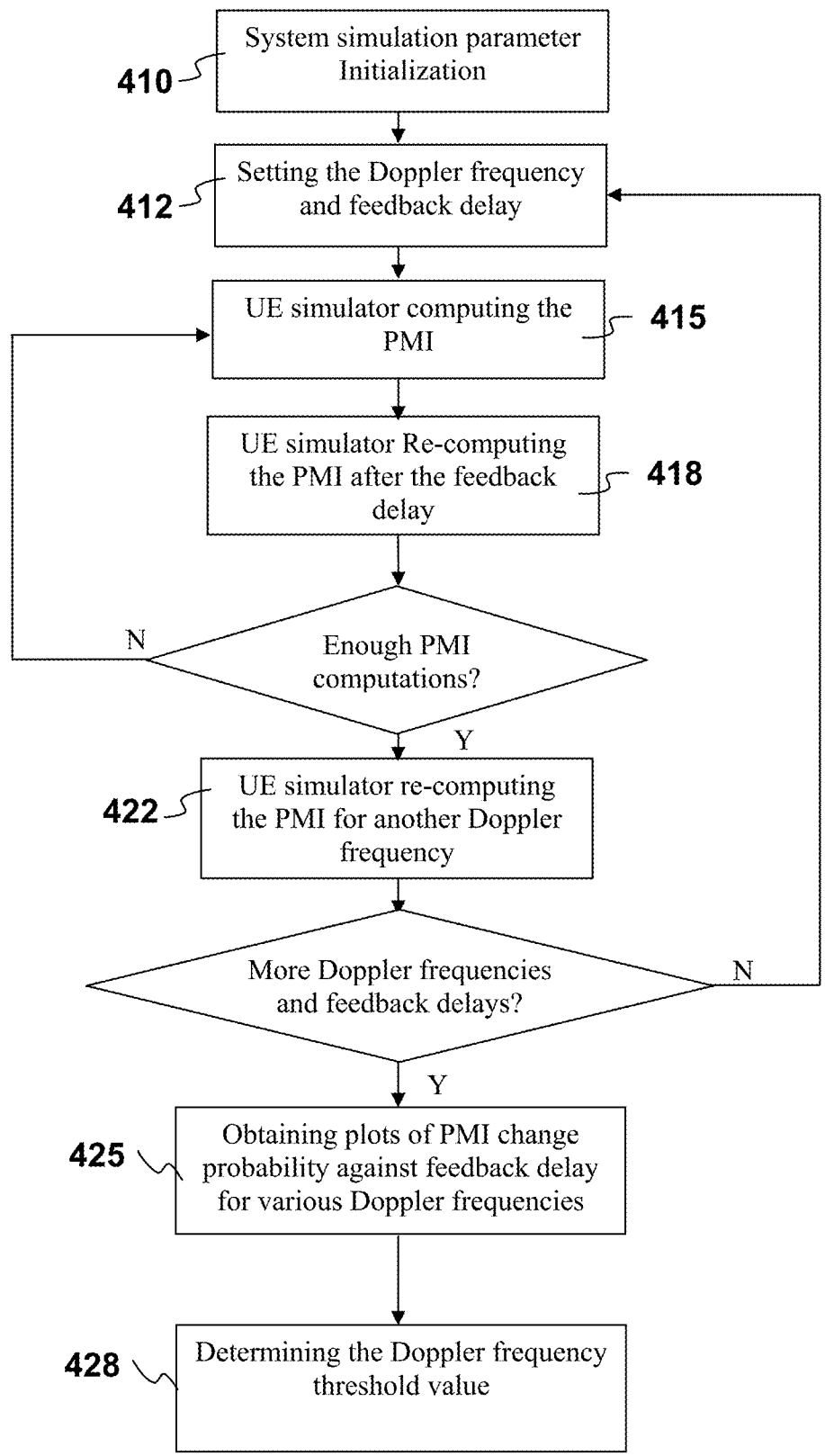
FIG. 4 shows a flowchart of a method of determining the threshold value of Doppler frequency in one embodiment.

FIG. 4 shows a flowchart of a method of determining the threshold value of Doppler frequency in one embodiment. In one embodiment, the system simulation parameters are firstly initialized during initialization 410. The system simulation parameters include channel model parameters and transceiver parameters (i.e. frequency-time domain resource block allocation, the number of transmitting antennas and the number of receiving antennas, etc).

Different Doppler frequencies and feedback delays are preselected during setting 412. The respective values for Doppler frequencies and feedback delays are selected according to the constraints of LTE system specifications and the physical channel conditions in which the system will be deployed. For the Doppler frequency, 5 Hz Doppler is a parameter for an indoor channel, so frequencies $f_1$ to $f_n$ around 5 Hz are chosen where n is the number of Doppler frequencies to be used to obtain a PMI change probability. For each Doppler frequency, feedback delays $d_1$ to $d_m$ are selected where m is the number of feedback delays. For each feedback delay, a PMI change probability is computed. In choosing the feedback delay, a feedback delay up to 80 ms is used for simulation in one embodiment because the frame length is 10 ms and the PMI feedback will take a few frames. For each of the n Doppler frequencies, m PMI change probabilities are determined during computation 415 and 418. The PMI change probability is computed based on a plurality of PMI estimates from the UE given the feedback delay and the Doppler frequency. The PMI estimates are determined by exhaustive computations of channel capacities with all the available PMI matrices. On the other hand, the PMI parameter is chosen according to the maximum of the channel capacity. Additional PMI parameters are determined by the UE simulator by reiterating the computation 415 and 418 until there are enough PMI estimates, i.e., m PMI estimates. The PMI change probability Pc is computed based on the statistics of the change of the consecutive PMI estimates as in the following equation:

$$P_C = \frac{1}{m-1} \sum_{i=1}^{m-1} \mathit{diff}(PMI_i, PMI_{i+1}) \qquad (3)$$

where $\mathit{diff}(PMI_i, PMI_{i+1})=1$ when the two parameters are different, or else equals to zero.

For the number m, if the PMI change probability is expected to be around 0.1, at least 100 PMI parameters should be estimated to obtain stable statistics.

The computations 415 and 418 are repeated for other Doppler frequencies selected from the n Doppler frequencies during recomputation 422. In case more Doppler frequency candidates or feedback delay candidates are desired, the computation 415 and 418 will be repeated to obtain additional results.

If there is no more candidate for the Doppler frequency or feedback delay, the PMI change probability against feedback delay curves for a plurality of Doppler frequencies is obtained during plotting 425. Given an acceptable PMI change probability, the threshold value of Doppler frequency for open loop/closed loop switching is determined by checking the Doppler frequency corresponding to the acceptable PMI change probability on the curves in a threshold value determination step 428.

The present invention substantially transfers the problem of determining a threshold value of Doppler frequency from intuitive estimation to an analytical engineering technique based on what magnitude of PMI change probability is suitable for open loop/closed loop mode switching. For example, it is determined from the graph what the threshold value is if the PMI change probability threshold value is chosen to be around 20~30%. Therefore, the threshold value of Doppler frequency for mode switching is analytically determined. An advantage of the present invention is that it makes the problem of determining a threshold value of Doppler frequency feasible and understandable based on analytical engineering practices.

Figure 5:
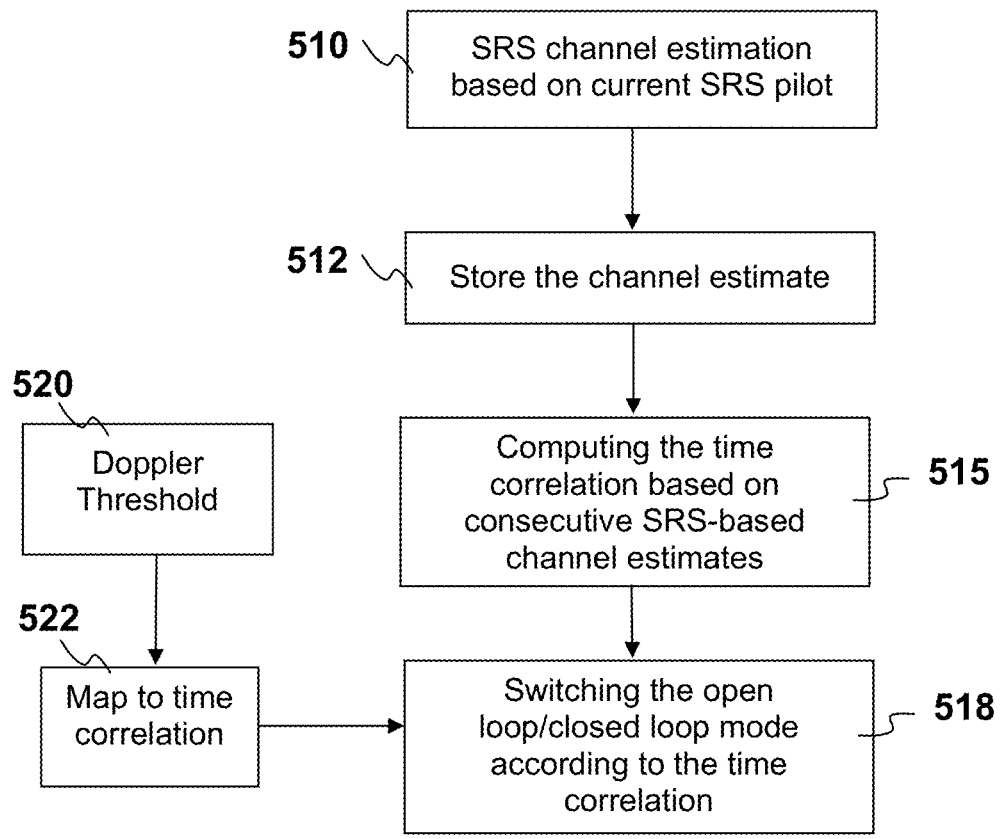
FIG. 5 shows a flowchart of estimating Doppler frequency and performing open loop/closed loop mode switching in one embodiment.

FIG. 5 shows a flowchart of estimating Doppler frequency and performing open loop/closed loop mode switching in one embodiment. Channel estimation is to estimate channel responses based on the current SRS to obtain SRS-based channel estimates during channel estimation 510. More SRS-based channel estimates are obtained by performing channel estimation based on other subsequent SRS at subsequent time instances. Subsequently the channel estimates are stored in a memory during storage 512 for the computation for next computation use.

A simplification of storage 512 can optionally be made. Instead of storing the estimate of channel coefficients, the system stores only the signs of the real and the imaginary parts of the channel response coefficients estimate. It can be shown that such simplification can reduce the hardware complexity significantly without significant performance degradation.

In time correlation 515, the time correlation value is determined based on any two consecutive SRS-based channel estimates. In one embodiment, the temporal correlation can be computed using the current channel estimate and the previous channel estimate, which has been stored in the last SRS time instance. The threshold value of Doppler 520, which is determined based on the plot of PMI change probability against feedback delays for various Doppler frequencies as described above, is transformed into a channel temporal correlation threshold value through mapping 522. The Doppler threshold value is mapped to a threshold value of channel temporal correlation using Clarke/Jakes autocorrelation function according to the following equation (4):

$$R = J_0(2\pi f_d t) \quad (4)$$

where $J_0(x)$ is the zero order Bessel function of the first kind, $f_d$ is the Doppler value and t is the delay. The Clarke/Jakes model assumes a rich-scattering environment. In other words, the receiver is surrounded by scatterers, such that the signal is received omnidirectionally by the receiver. Generally speaking, indoor environments and urban environments are examples of rich-scattering environments.

Therefore, the channel temporal correlation can also be mapped to a Doppler frequency according to the following equation such that the Doppler frequency is estimated based on the assumption of a rich-scattering environment:

$$\rho(T_{SRS}) = J_0(2\pi f_d T_{SRS}) \quad (4a)$$

where $T_{SRS}$ is the time difference between two SRS-based channel estimates.

The advantage of this embodiment is that the channel temporal correlation threshold value is determined analytically rather than by a simple estimation. If the channel temporal correlation is above the threshold value, the system is changing slowly therefore the closed-loop mode should be used. The open-loop mode should be used if the time-correlation is below the time-correlation threshold value. The mode switching between open loop/closed loop modes is performed in a control 518 according to the comparison result by comparing the channel temporal correlation value obtained from consecutive SRS-based channel estimates in the time correlation step 515 with the threshold value of channel temporal correlation. Therefore, based on the Doppler frequency threshold value, a change between the open loop mode and closed loop mode is controlled.

Figure 6:
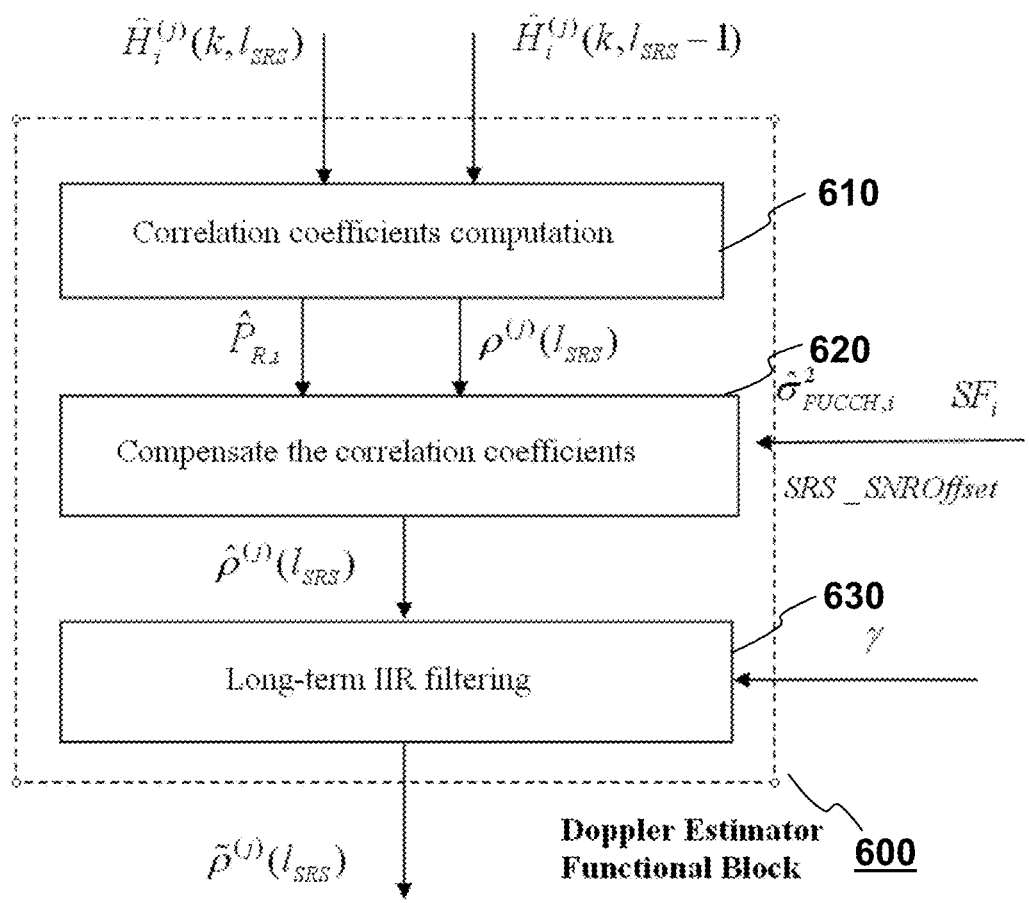
FIG. 6 shows a flowchart of how the channel temporal correlation is estimated in one embodiment.

FIG. 6 shows a flowchart of how the channel temporal correlation is computed in one embodiment. In general, the greater the rate of channel variation is, the lower the channel temporal correlation will be. Therefore, based on the inversely proportional relationship between the rate of channel variation and the channel temporal correlation, the rate of channel variation can be estimated based on the channel temporal correlation and vice versa. In order to determine the channel temporal correlation, one or more pairs of channel estimates are used by a Doppler estimator functional block 600. Each channel estimate is an estimate of a set of channel response coefficients. The Doppler estimator functional block 600 checks a time period between each pair of channel estimates so as to compute the correlation. In this exemplary embodiment, SRS-based channel estimates, which are estimated by a number of SRS symbols in an LTE system, are used.

The SRS configuration of a user equipment is configured dynamically to facilitate the estimation of channel temporal correlation. For example, the configurations as shown in FIG. 1B and FIG. 1C with reference to their corresponding description can be used.

The Doppler estimator functional block 600 uses the SRS-based channel estimation at different periods, for example, between $l_{SRS}^{th}$ and $l_{SRS}-1^{th}$ SRS periods, whereas $\hat{H}_i^{(j)}(k, l_{SRS})$ denotes the SRS-based channel estimation for $j^{th}$ user, $i^{th}$ antenna, $k^{th}$ subcarrier during the $l_{SRS}^{th}$ SRS period; and $\hat{H}_i^{(j)}(k, l_{SRS}-1)$ denotes the SRS-based channel estimation for $j^{th}$ user, $i^{th}$ antenna, $k^{th}$ subcarrier during the $l_{SRS}-1^{th}$ SRS period, to compute the estimated total received power for $i^{th}$ antenna, $\hat{P}_{R,i}$, and the estimated channel correlation for $i^{th}$ antenna and $j^{th}$ user, $\rho_i^{(j)}(l_{SRS})$ during the correlation coefficients computation 610.

The Doppler estimator functional block 600 then combines $\hat{P}_{R,i}$ and $\rho_i^{(j)}(l_{SRS})$ to compute a compensated estimate of the estimated channel temporal correlation for $j^{th}$ user during the $l_{SRS}^{th}$ SRS period, $\hat{\rho}^{(j)}(l_{SRS})$, through compensated estimation 620. The $\hat{\rho}^{(j)}(l_{SRS})$ for each user $j^{th}$ is subsequently averaged by an IIR filter (infinite impulse response filter) with configurable forgetting factor $\gamma$ through a long-term IIR filtering 630 to obtain an averaged estimated channel temporal correlation for $j^{th}$ user during the $l_{SRS}^{th}$ SRS period: $\tilde{\rho}^{(j)}(l_{SRS})$. The details of the computation can be shown from the formulae derivation listed below:

The correlation coefficients for the current SRS period (around time of $l_{SRS}^{th}$ SRS period) are estimated from the currently and previously received SRS symbols of each user. Since each user's Doppler estimation is performed independently, in the following, the user index j will be omitted for simplicity. Consider the quantity $y_i$:

$$y_i = \frac{|E\{\hat{H}_i(l_{SRS}) \cdot \hat{H}_i^*(l_{SRS} - 1)\}|}{\sqrt{E\{|\hat{H}_i(l_{SRS})|^2\}} \cdot \sqrt{E\{|\hat{H}_i^*(l_{SRS} - 1)|^2\}}}, \quad (5)$$

for $l_{SRS} = 0, 1, 2,$ where $\hat{H}_i(l_{SRS}) = H_i(l_{SRS}) + N(l_{SRS})$ is the channel estimate for the is $l_{SRS}^{th}$ SRS period, and $N(l_{SRS})$ is zero-mean independent and identically distributed (i.i.d.) estimation error with power $P_N$ for the user. Accordingly, the quantity $y_i$ is re-written as $$y_i = \frac{|E\{H(l_{SRS}) \cdot H^*(l_{SRS} - 1)\}|}{\sqrt{E\{|H(l_{SRS})|^2\} + P_N} \cdot \sqrt{E\{|H(l_{SRS} - 1)|^2\} + P_N}} \quad (6)$$

Assuming $P_S = E\{|H^{(j)}(l_{SRS})|^2\} = E\{|H^{(j)}(l_{SRS}-1)|^2\}$ to be the channel power and that the channel power is invariant of time, the quantity $y_i$ is:

$$y_i = \frac{P_S}{(P_S + P_N)} \frac{|E\{H_i(l_{SRS}) \cdot H_i^*(l_{SRS} - 1)\}|}{\sqrt{E\{|H_i(l_{SRS})|^2\}} \cdot \sqrt{E\{|H_i(l_{SRS} - 1)|^2\}}} \quad (7)$$

$$= \frac{P_S}{(P_S + P_N)} \cdot \rho_{ideal}(l_{SRS})$$

Hence,

-continued $$\rho_{ideal}(l_{SRS}) = \left(1 + \frac{P_N}{P_S}\right) \cdot y_i \quad (8)$$

Observing the expression of the quantity $y_i$, an unbiased channel temporal correlation coefficient for the $i^{th}$ antenna can hence be chosen as:

$$\hat{\rho}_i(l_{SRS}) = \quad (9)$$

$$\left(1 + \frac{\hat{P}_{N,i}}{\hat{P}_{S,i}}\right) \frac{\left|\sum_{k=0}^{M_{sc}^{SRS}-1} [\hat{H}_i(k, l_{SRS}) \cdot \hat{H}_i^*(k, l_{SRS} - 1)]\right|}{\sqrt{\sum_{k=0}^{M_{sc}^{SRS}-1} |\hat{H}_i(k, l_{SRS})|^2} \cdot \sqrt{\sum_{k=0}^{M_{sc}^{SRS}-1} |\hat{H}_i(k, l_{SRS} - 1)|^2}} =$$

$$\left(1 + \frac{\hat{P}_{N,i}}{\hat{P}_{S,i}}\right)$$

$$\left|\sum_{k=0}^{M_{sc}^{SRS}-1} \left[\frac{\hat{H}_i(k, l_{SRS})}{\sqrt{\sum_{k=0}^{M_{sc}^{SRS}-1} |\hat{H}_i(k, l_{SRS})|^2}} \cdot \frac{\hat{H}_i^*(k, l_{SRS} - 1)}{\sqrt{\sum_{k=0}^{M_{sc}^{SRS}-1} |\hat{H}_i(k, l_{SRS} - 1)|^2}}\right]\right|$$

and for the correlation output of receiving antennas are averaged to obtain the final output for the current SRS stream, where $\hat{P}_{S,i}$ and $P_{N,i}$ are the estimates of the channel signal power and channel estimation error power of the user at the $i^{th}$ antenna. Problem arises when the signal-to-noise ratio (SNR) is low, the error in the compensation factors may cause $\hat{\rho}(l_{SRS}) > 1$. Hence the above equation (9) is modified to the following equation (10) as follows:

$$\hat{\rho}_i(l_{SRS}) = \min\left(\left(1 + \frac{\hat{P}_{N,i}}{\hat{P}_{S,i}}\right) \left|\sum_{k=0}^{M_{sc}^{SRS}-1} \frac{\hat{H}_i(k, l_{SRS})}{\sqrt{\sum_{k=0}^{M_{sc}^{SRS}-1} |\hat{H}_i(k, l_{SRS})|^2}} \cdot \frac{\hat{H}_i^*(k, l_{SRS} - 1)}{\sqrt{\sum_{k=0}^{M_{sc}^{SRS}-1} |\hat{H}_i(k, l_{SRS} - 1)|^2}}\right|, 1\right) \quad (10)$$

Nevertheless, in view of the large memory requirement, the simplification as mentioned above regarding storing only the signs of the real and the imaginary parts of the channel response coefficients estimate can be adopted, in which the correlation may instead be estimated as in the equation (11) as follows:

$$\hat{\rho}_i(l_{SRS}) = \frac{1}{G_{Bussgang}} \min\left(1 + \frac{\hat{P}_{N,i}}{\hat{P}_{S,i}}\right) \cdot \quad (11)$$

$$\max\left(\frac{1}{M_{sc}^{SRS}} \sum_{k=0}^{M_{sc}^{SRS}-1} \left[\frac{\text{Re}(\hat{H}_i(k, l_{SRS})) \frac{\text{Re}(\hat{H}_{Sgn,i}(k, l_{SRS} - 1))}{\sqrt{2}}}{\sqrt{\sum_{k=0}^{M_{sc}^{SRS}-1} |\hat{H}_i(k, l_{SRS})|^2}} + \frac{\text{Im}(\hat{H}_i(k, l_{SRS})) \frac{\text{Im}(\hat{H}_{Sgn,i}(k, l_{SRS} - 1))}{\sqrt{2}}}{\sqrt{\sum_{k=0}^{M_{sc}^{SRS}-1} |\hat{H}_i(k, l_{SRS})|^2}}\right], 0\right), 1\right) =$$

-continued $$\frac{1}{G_{Bussgang}\sqrt{2}}\min\left(1+\frac{\hat{P}_{N,i}}{\hat{P}_{S,i}}\right).$$

$$\max\left\{\frac{1}{M_{sc}^{SRS}}\sum_{k=0}^{M_{sc}^{SRS}-1}\left[\frac{\text{Re}(\hat{H}_i(k,l_{SRS}))\text{Re}(\hat{H}_{Sgn,i}(k,l_{SRS}-1))}{\sqrt{\sum_{k=0}^{M_{sc}^{SRS}-1}|\hat{H}_i(k,l_{SRS})|^2}}+\frac{\text{Im}(\hat{H}_i(k,l_{SRS}))\text{Im}(\hat{H}_{Sgn,i}(k,l_{SRS}-1))}{\sqrt{\sum_{k=0}^{M_{sc}^{SRS}-1}|\hat{H}_i(k,l_{SRS})|^2}}\right],0\right\},1$$

where:

$$\text{Re}(\hat{H}_{Sgn,i}(k,l_{SRS}))=\begin{cases}1 & \text{if } \text{Re}(\hat{H}_i(k,l_{SRS}))\geq 0\\-1 & \text{if } \text{Re}(\hat{H}_i(k,l_{SRS}))<0\end{cases} \quad (12)$$

$$\text{Im}(\hat{H}_{Sgn,i}(k,l_{SRS}))=\begin{cases}1 & \text{if } \text{Im}(\hat{H}_i(k,l_{SRS}))\geq 0\\-1 & \text{if } \text{Im}(\hat{H}_i(k,l_{SRS}))<0\end{cases} \quad (13)$$

$$G_{Bussgang}=0.787 \quad (14)$$

such that only the signs of the current channel coefficient estimates need to be stored for the processing of the next SRS and $G_{Bussgang}$ is the ratio of the modified autocorrelation function to the original autocorrelation function. Such simplification is based on the rationale of Bussgang theorem and has been verified to be valid without introducing much performance loss.

And the overall channel temporal correlation is obtained by the equation (15) as follows:

$$\hat{\rho}(l_{SRS})=\frac{1}{N_{Rx}}\sum_{i=1}^{N_{Rx}}\hat{\rho}_i(l_{SRS}) \quad (15)$$

The reason that the correlation coefficients are required to be determined for each antenna separately is because each antenna has different power compensation factors.

A first-order IIR filter is applied on the correlation estimates for long-term averaging purpose. It can be written as in the following equation (16):

$$\hat{\rho}_{av}(l_{SRS})=(1-\gamma)\hat{\rho}_{av}(l_{SRS}-1)+\gamma\cdot\hat{\rho}_{curr}(l_{SRS}) \quad (16)$$

where $\gamma$ is to control the forgetting factor. The long-term averaging may be done by the upper layer or by the physical layer.

The physical layer is responsible for computing the time correlation of the channels between consecutive SRS. It may be up to the upper layer to decide how to perform the long-term averaging and the upper layer may also decide the convergence time so that after the convergence time, the output of the long-term averaging is deemed reliable. For example, in rich-scattering environment with Doppler spread, the threshold of channel temporal correlation $\rho_{thre}^{(j)}=J(2\pi f_d T_{SRS\_period})=0.9037$ corresponds to Doppler frequency threshold of $f_d=5$ Hz and the period between two consecutive UpPTS (uplink pilot time slot) containing SRS from the same user, $T_{SRS\_period}=20$ ms.

Compensation Factor Computation

Each antenna has different power compensation factor and the power compensation factor needs to be computed individually for each. The value computed $\hat{P}_{N,i}$ and $\hat{P}_{S,i}$ will be used in equations including (9), (10), (11) to compensate the time correlations:

1) For $\hat{P}_{N,i}$, it is defined as the SRS channel estimation error power estimate for the $i^{th}$ receiving antenna.

2) For $\hat{P}_{S,i}$, it is defined as the estimate of channel signal power, $P_{S,i}=E\{|H_i(l_{SRS})|^2\}$. The channel signal power is estimated by the following equation (17):

$$\hat{P}_{S,i}=\hat{P}_{R,i}-\hat{P}_{N,i} \quad (17)$$

where $\hat{P}_{R,i}$ is obtained from the SRS channel estimation. However, the estimation error in $\hat{P}_{R,i}$ and $\hat{P}_{N,i}$ may give a poor estimate of $\hat{P}_{S,i}$. The equation is hence modified into the following equation (18):

$$\hat{P}_{S,i}=\max(\hat{P}_{R,i}-\hat{P}_{N,i},\hat{P}_{N,i}) \quad (18)$$

The lower bound of the channel signal power $\hat{P}_{S,i}$ is the SRS channel estimation error power estimate $\hat{P}_{N,i}$ because if the channel signal power $\hat{P}_{S,i}$ is much smaller than $\hat{P}_{N,i}$, the channel signal power $\hat{P}_{S,i}$ can no longer be accurately estimated, and if the $\hat{P}_{S,i}$ is too small, there will be the over-boosting problem for the compensation factor.

For the first iteration, i.e., $l_{SRS}=0$ the current correlation coefficient, $\hat{\rho}_{curr}(0)$, cannot be computed since there is no previous channel estimate, $\hat{H}_{Sgn,i}(k,l_{SRS}-1)$. The long-term average correlation coefficient, $\hat{\rho}_{av}(0)$, cannot be computed as well. In one embodiment of the present invention, $\hat{\rho}_{av}(0)=0$.

For the second iteration, i.e. $l_{SRS}=1$ the current correlation coefficient, $\hat{\rho}_{curr}(1)$, can be computed. And it is assumed that $\hat{\rho}_{av}(1)=\hat{\rho}_{curr}(1)$.

The above has shown the use of $\hat{H}_{Sgn,i}(k,l_{SRS}-1)$ (sign of real and imaginary part of channel estimate) rather than $\hat{H}_i(k,$ $1_{SRS}-1$) (whole complex number channel estimate) during the computation of $\hat{\rho}^{(j)}(1_{SRS})$. This is related to an embodiment of the storage 512 in FIG. 5, the method is to store the channel estimates for the previous and current SRS period ($1_{SRS}-1^{th}$ period). In this embodiment, only the signs of real and imaginary parts of the channel estimate of the previous SRS period are stored, which reduces the storage requirement significantly.

After the channel temporal correlation is estimated, a mode of communications can be determined. The estimated channel temporal correlation is compared with one or more thresholds. In the present embodiment, once threshold is used and when the estimated channel temporal correlation is above the threshold, the closed-loop MIMO transmission mode is selected and used.

Embodiments of the present invention may be implemented in the form of software, hardware, application logic or a combination of software, hardware and application logic. The software, application logic and/or hardware may reside on integrated circuit chips, modules or memories. If desired, part of the software, hardware and/or application logic may reside on integrated circuit chips, part of the software, hardware and/or application logic may reside on modules, and part of the software, hardware and/or application logic may reside on memories. In one exemplary embodiment, the application logic, software or an instruction set is maintained on any one of various conventional non-transitory computer-readable media.

Processes and logic flows which are described in this specification can be performed by one or more programmable processors executing one or more computer programs to perform functions by operating on input data and generating output. Processes and logic flows can also be performed by special purpose logic circuitry, e.g., an FPGA (field programmable gate array) or an ASIC (application-specific integrated circuit).

Apparatus or devices which are described in this specification can be implemented by a programmable processor, a computer, a system on a chip, or combinations of them, by operating on input data and generating output. Apparatus or devices can include special purpose logic circuitry, e.g., an FPGA (field programmable gate array) or an ASIC (application-specific integrated circuit). Apparatus or devices can also include, in addition to hardware, code that creates an execution environment for computer program, e.g., code that constitutes processor firmware, a protocol stack, a database management system, an operating system, a cross-platform runtime environment, e.g., a virtual machine, or a combination of one or more of them.

As used herein, the term "processor" broadly relates to logic circuitry that responds to and processes instructions. Processors suitable for the present invention include, for example, both general and special purpose processors such as microprocessors, and any one or more processors of any kind of digital computer. Generally, a processor will receive instructions and data from one or more memory devices such as a read-only memory, a random access memory, a non-transitory computer-readable media, or combinations thereof. Alternatively, the processor may include special purpose logic circuitry, e.g., an FPGA (field programmable gate array) or an ASIC (application-specific integrated circuit) configured to perform the functions described above. When the processor is a computer, the elements generally include one or more microprocessors for performing or executing instructions, and one or more memory devices for storing instructions and data.

Computer-readable medium that can store data and instructions for the processes of the present invention as described in this specification may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. Computer-readable media may include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

A computer program (also known as, e.g., a program, software, software application, script, or code) can be written in any programming language, including compiled or interpreted languages, declarative or procedural languages, and it can be deployed in any form, including as a stand-alone program or as a module, component, subroutine, object, or other unit suitable for use in a computing environment. A computer program can be deployed to be executed on one computer or on multiple computers that are located at one single site or distributed across multiple sites and interconnected by a communication network.

Embodiments and/or features as described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with one embodiment as described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The whole specification contains many specific implementation details. These specific implementation details are not meant to be construed as limitations on the scope of the invention or of what may be claimed, but rather as descriptions of features specific to particular embodiments of the invention.

Certain features that are described in the context of separate embodiments can also be combined and implemented as a single embodiment. Conversely, various features that are described in the context of a single embodiment can also be implemented in multiple embodiments separately or in any suitable subcombinations. Moreover, although features may be described as acting in certain combinations and even initially claimed as such, one or more features from a combination as described or a claimed combination can in certain cases be excluded from the combination, and the claimed combination may be directed to a subcombination or variation of a subcombination. Although various aspects of the invention are set out in the independent claims, other aspects of the invention comprise other combinations of features from the embodiments and/or from the dependent claims with the features of the independent claims, and not solely the combinations explicitly set out in the claims.

Certain functions which are described in this specification may be performed in a different order and/or concurrently with each other. Furthermore, if desired, one or more of the above-described functions may be optional or may be combined.

The above descriptions provide exemplary embodiments of the present invention, but should not be viewed in a limiting sense. Rather, it is possible to make variations and modifications without departing from the scope of the present invention as defined in the appended claims.

The present invention may be implemented using general purpose or specialized computers or microprocessors programmed according to the teachings of the present disclosure. Computer instructions or software codes running in the general purpose or specialized computers or microprocessors can readily be prepared by practitioners skilled in the software art based on the teachings of the present disclosure.

In some embodiments, the present invention includes a computer storage medium having computer instructions or software codes stored therein which can be used to program a computer or microprocessor to perform any of the processes of the present invention. The storage medium can include, but is not limited to, floppy disks, optical discs, Blu-ray Disc, DVD, CD-ROMs, and magneto-optical disks, ROMs, RAMs, flash memory devices, or any type of media or device suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for estimating a channel temporal correlation or a rate of channel variation to determine a mode of communications in a MIMO communications system, comprising:

computing, by one or more processors, a correlation between channel response coefficients of a pair of snapshots of channel response for each of a plurality of snapshots wherein each snapshot is a set of channel response coefficients;

processing information on the time difference between each pair of snapshots; and comparing the estimated channel temporal correlation with a threshold value of channel temporal correlation, or comparing the estimated rate of channel variation with a threshold value of rate of channel variation, such that the mode of communications is determined to be a closed-loop MIMO transmission mode when the estimated channel temporal correlation is higher than the threshold value of channel temporal correlation, or the estimated rate of channel variation is lower than the threshold value of rate of channel variation.

2. The method as claimed in claim 1, further comprising: estimating a snapshot of the channel response using one or more SRS symbols in an LTE system.

3. The method as claimed in claim 2, further comprising:
configuring the SRS symbols from one or more user equipments in the LTE system to facilitate the estimation of the channel temporal correlation.

4. The method as claimed in claim 2, further comprising:
replacing channel response coefficients of one or both snapshots in the pair of snapshots of the channel response with signs of the real and imaginary parts of such channel response coefficients when computing the correlation between a pair of snapshots of a channel response for each of a plurality of snapshots;

wherein the channel response coefficients of an earlier snapshot of channel response is replaced with the signs of the real and imaginary parts of such channel response coefficients when computing the correlation between a pair of snapshots of a channel response for each of a plurality of snapshots; and storing the signs of the real and imaginary parts of channel response coefficients of a current snapshot instead of the channel response coefficients for computing the channel temporal correlation for a future snapshot such that the implementation complexity is reduced.

5. The method as claimed in claim 1, wherein:
the threshold value of channel temporal correlation or the threshold value of rate of channel variation is determined by:

selecting a plurality of feedback delays $d_1$ to $d_m$ where m is the number of feedback delays to be used to obtain a Precoding Matrix Indicator (PMI) change probability set for one Doppler frequency value;

determining a plurality of PMI change probability sets for a plurality of Doppler frequencies $f_1$ to $f_n$ where n is the number of Doppler frequencies to be used to obtain a PMI change probability set;

determining a Doppler frequency and a threshold value of channel temporal correlation based on the PMI change probability sets; and mapping the Doppler frequency to a channel temporal correlation, according to the assumption of rich-scattering environment such that $$\rho(T_{SRS}) = J_0(2\pi f_d T_{SRS})$$

where $J_0$ is the zeroth-order Bessel function of the first kind.

6. The method as claimed in claim 5, further comprising:
replacing the channel response coefficients of an earlier snapshot of channel response with the signs of the real and imaginary parts of such channel response coefficients when computing the correlation between a pair of snapshots of a channel response for each of a plurality of snapshots; and storing the signs of the real and imaginary parts of channel response coefficients of a current snapshot instead of the channel response coefficients for computing the channel temporal correlation for a future snapshot such that the implementation complexity is reduced.

7. The method as claimed in claim 1, further comprising:
replacing the channel response coefficients of one or both snapshots in the pair of snapshots of the channel response with signs of the real and imaginary parts of such channel response coefficients when computing the correlation between a pair of snapshots of a channel response for each of a plurality of snapshots.

8. The method as claimed in claim 7, further comprising:
estimating a Doppler frequency by mapping a channel temporal correlation to a Doppler frequency according to the assumption of rich-scattering environment such that $$\rho(T_{SRS}) = J_0(2\pi f_d T_{SRS})$$

where $J_0$ is the zeroth-order Bessel function of the first kind.

9. The method as claimed in claim 1, further comprising:
estimating a Doppler frequency by mapping a channel temporal correlation to a Doppler frequency according to the assumption of rich-scattering environment such that $$\rho(T_{SRS}) = J_0(2\pi f_d T_{SRS})$$

where $J_0$ is the zeroth-order Bessel function of the first kind.

10. An apparatus for estimating a channel temporal correlation or a rate of channel variation to determine a mode of communications in a MIMO communications system, comprising:
one or more processors configured to:
compute a correlation between channel response coefficients of a pair of snapshots of channel response for each of a plurality of snapshots wherein each snapshot is a set of channel response coefficients;
process information on the time difference between each pair of snapshots; and
compare the estimated channel temporal correlation with a threshold value of channel temporal correlation, or compare the estimated rate of channel variation with a threshold value of rate of channel variation, such that the mode of communications is determined to be a closed-loop MIMO transmission mode when the estimated channel temporal correlation is higher than the threshold value of channel temporal correlation, or the estimated rate of channel variation is lower than the threshold value of rate of channel variation.

11. The apparatus as claimed in claim 10, wherein the one or more processors are further configured to:
estimate a snapshot of the channel response using one or more SRS symbols in an LTE system.

12. The apparatus as claimed in claim 11, wherein the one or more processors are further configured to:
configure the SRS symbols from one or more user equipments in the LTE system to facilitate the estimation of the channel temporal correlation.

13. The apparatus as claimed in claim 11, wherein the one or more processors are further configured to:
replace the channel response coefficients of one or both snapshots in the pair of snapshots of the channel response with signs of the real and imaginary parts of such channel response coefficients when computing the correlation between a pair of snapshots of a channel response for each of a plurality of snapshots;
wherein the channel response coefficients of an earlier snapshot of channel response is replaced with the signs of the real and imaginary parts of such channel response coefficients when computing the correlation between a pair of snapshots of a channel response for each of a plurality of snapshots; and
store the signs of the real and imaginary parts of channel response coefficients of a current snapshot instead of the channel response coefficients for computing the channel temporal correlation for a future snapshot such that the implementation complexity is reduced.

14. The apparatus as claimed in claim 10, wherein:
the threshold value of channel temporal correlation or the threshold value of rate of channel variation is determined by:
selecting a plurality of feedback delays $d_1$ to $d_m$ where m is the number of feedback delays to be used to obtain a Precoding Matrix Indicator (PMI) change probability set for one Doppler frequency value;
determining a plurality of PMI change probability sets for a plurality of Doppler frequencies $f_1$ to $f_n$ where n is the number of Doppler frequencies to be used to obtain a PMI change probability set;
determining a Doppler frequency and a threshold value of channel temporal correlation based on the PMI change probability sets; and
mapping the Doppler frequency to a channel temporal correlation, according to the assumption of rich-scattering environment such that $$\rho(T_{SRS}) = J_0(2\pi f_d T_{SRS})$$

where $J_0$ is the zeroth-order Bessel function of the first kind.

15. The apparatus as claimed in claim 14, wherein the one or more processors are further configured to:
replace the channel response coefficients of an earlier snapshot of channel response with the signs of the real and imaginary parts of such channel response coefficients when computing the correlation between a pair of snapshots of a channel response for each of a plurality of snapshots; and
store the signs of the real and imaginary parts of the channel response coefficients of a current snapshot instead of the channel response coefficients for computing the channel temporal correlation for a future snapshot such that the implementation complexity is reduced.

16. The apparatus as claimed in claim 10, wherein the one or more processors are further configured to:
replace the channel response coefficients of one or both snapshots in the pair of snapshots of the channel response with signs of the real and imaginary parts of such channel response coefficients when computing the correlation between a pair of snapshots of a channel response for each of a plurality of snapshots.

17. The apparatus as claimed in claim 16, wherein the one or more processors are further configured to:
estimate a Doppler frequency by mapping a channel temporal correlation to a Doppler frequency according to the assumption of rich-scattering environment such that $$\rho(T_{SRS}) = J_0(2\pi f_d T_{SRS})$$

where $J_0$ is the zeroth-order Bessel function of the first kind.

18. The apparatus as claimed in claim 10, wherein the one or more processors are further configured to:
estimate a Doppler frequency by mapping a channel temporal correlation to a Doppler frequency according to the assumption of rich-scattering environment such that $$\rho(T_{SRS}) = J_0(2\pi f_d T_{SRS})$$

where $J_0$ is the zeroth-order Bessel function of the first kind.

19. A method for estimating a channel temporal correlation or a rate of channel variation to determine a mode of communications in a MIMO communications system, comprising:

computing, by one or more processors, a correlation between channel response coefficients of a pair of snapshots of channel response for each of a plurality of snapshots wherein each snapshot is a set of channel response coefficients;

replacing the channel response coefficients of one or both snapshots in the pair of snapshots of the channel response with signs of the real and imaginary parts of such channel response coefficients when computing the correlation between a pair of snapshots of a channel response for each of a plurality of snapshots; and processing information on the time difference between each pair of snapshots.

\* \* \* \* \*